Sept. 27, 1960
C. S. ASH
2,954,137
RAMP LOADER
Filed July 2, 1958
8 Sheets-Sheet 1
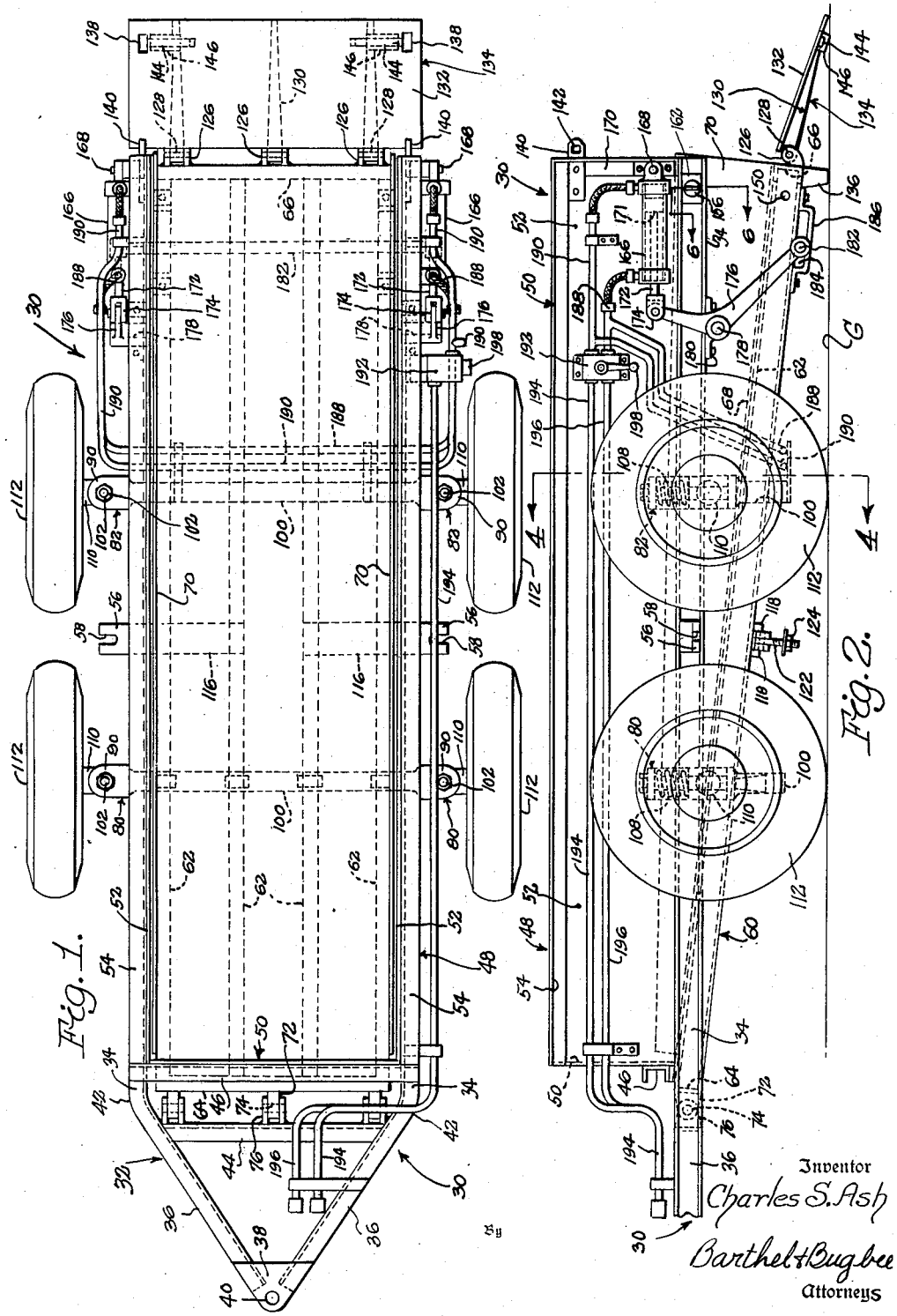
Inventor
Charles S. Ash
Barthel & Bugbee
Attorneys Sept. 27, 1960   C. S. ASH   2,954,137
RAMP LOADER
Filed July 2, 1958   8 Sheets-Sheet 2
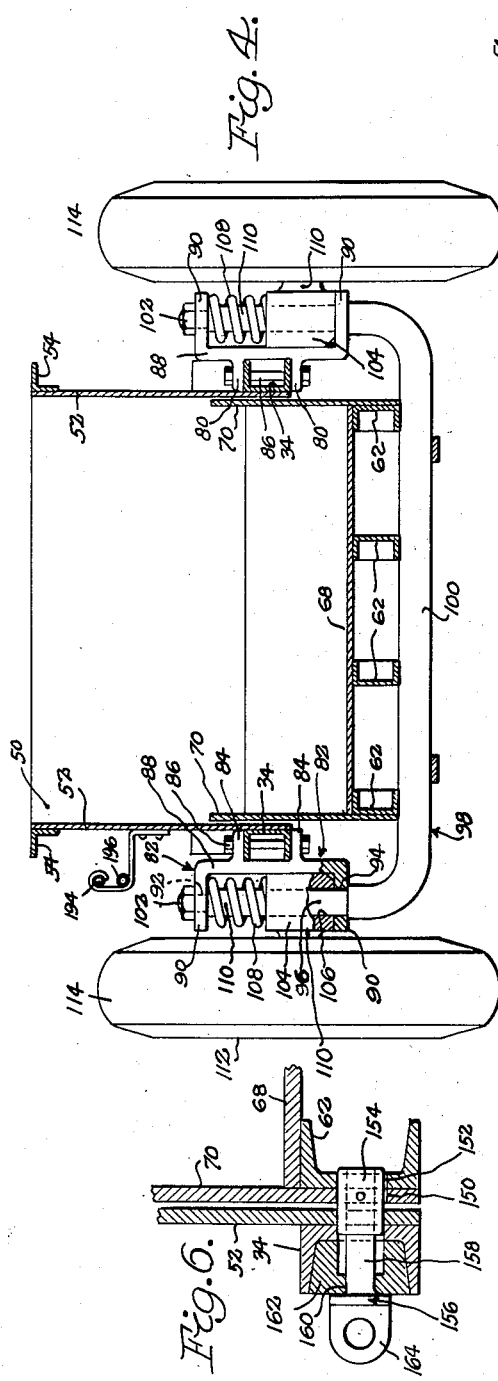
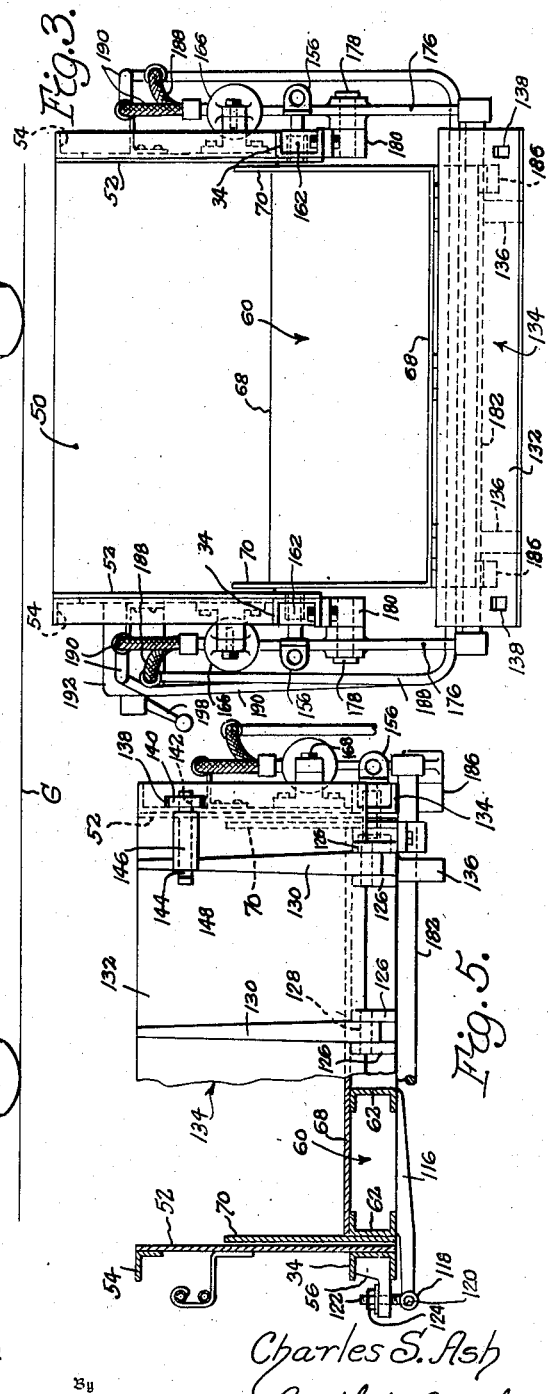
Charles S. Ash
Barthel + Bugbee
Attorneys

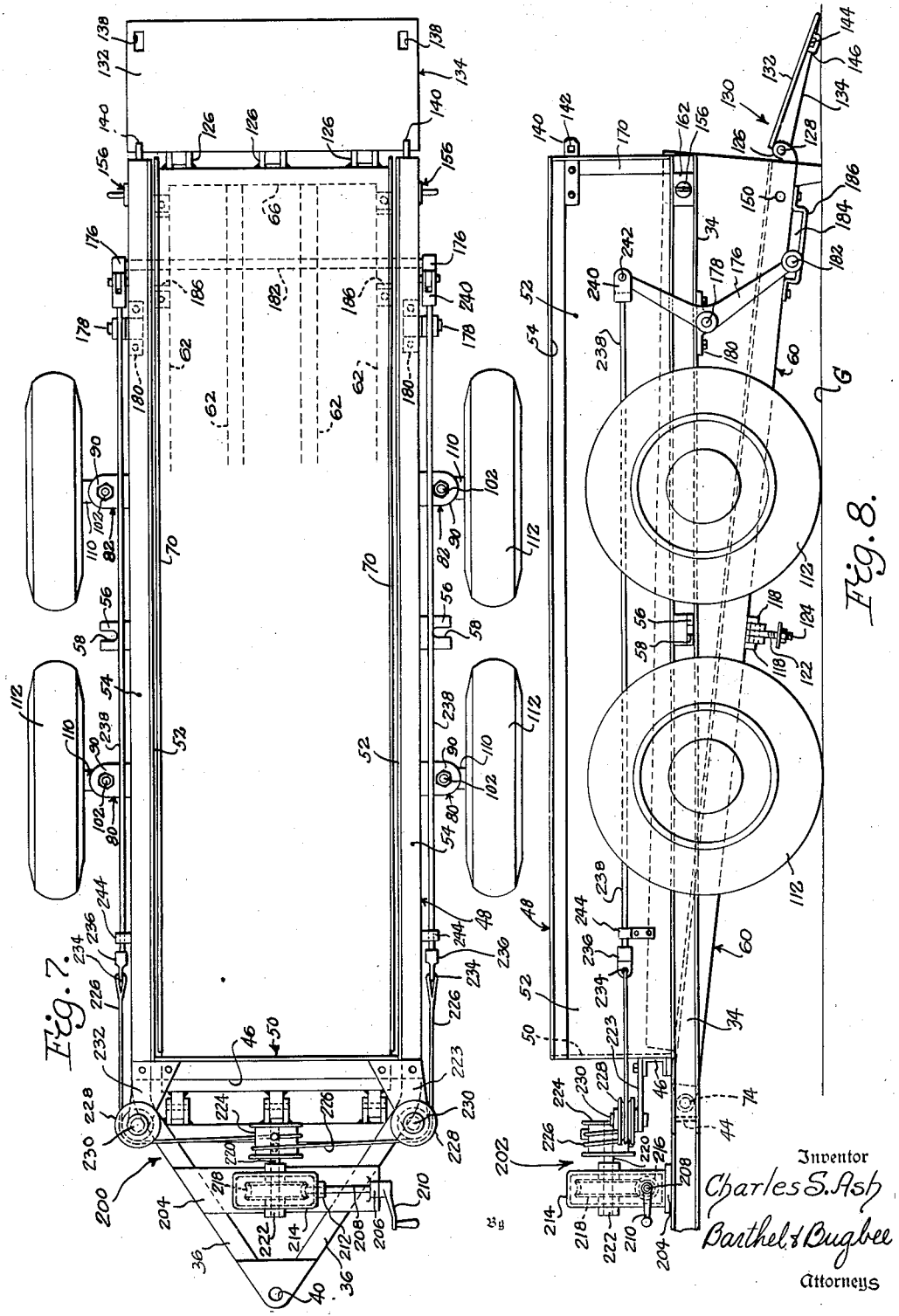

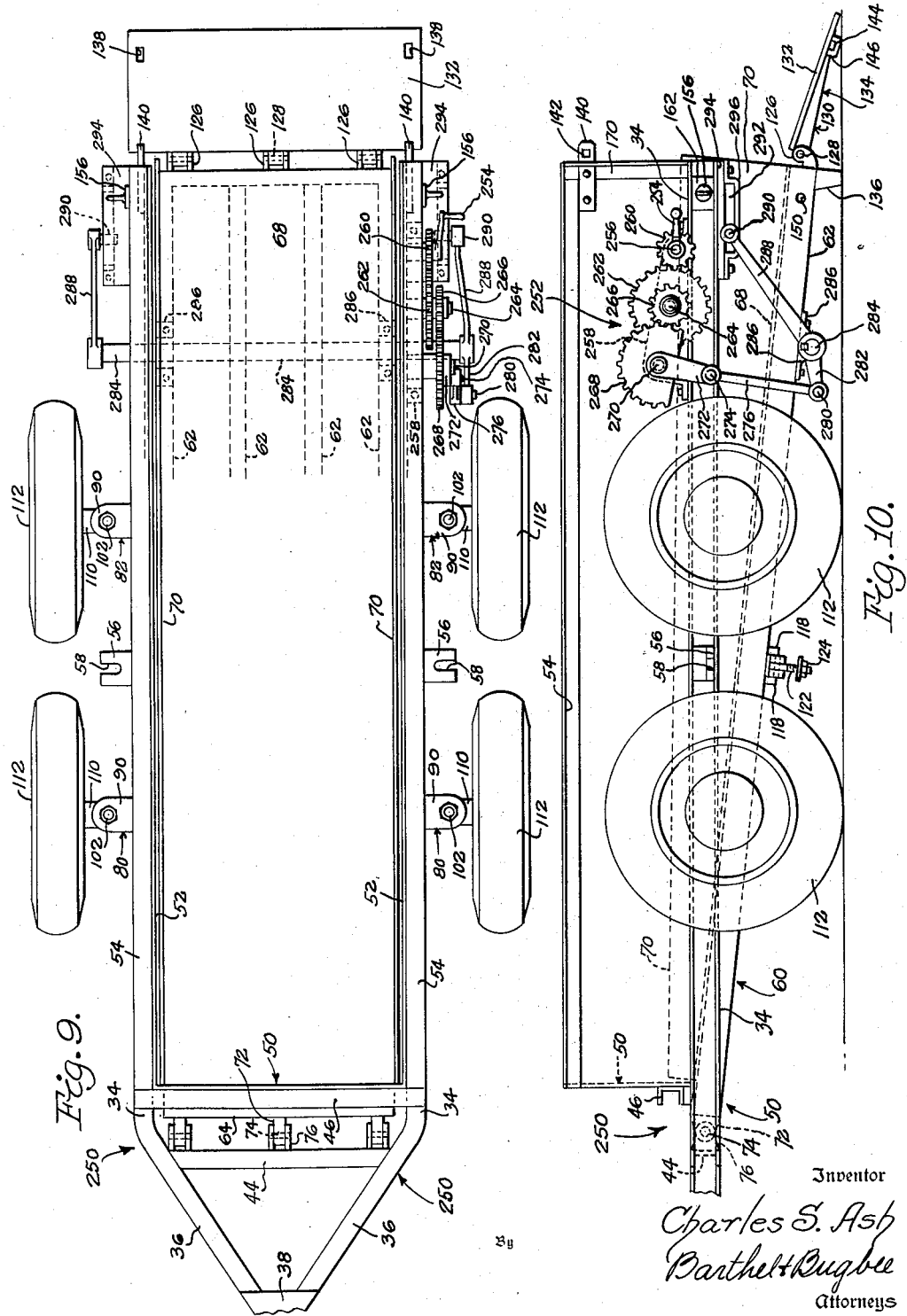

Sept. 27, 1960
C. S. ASH
2,954,137
RAMP LOADER
Filed July 2, 1958
8 Sheets-Sheet 5
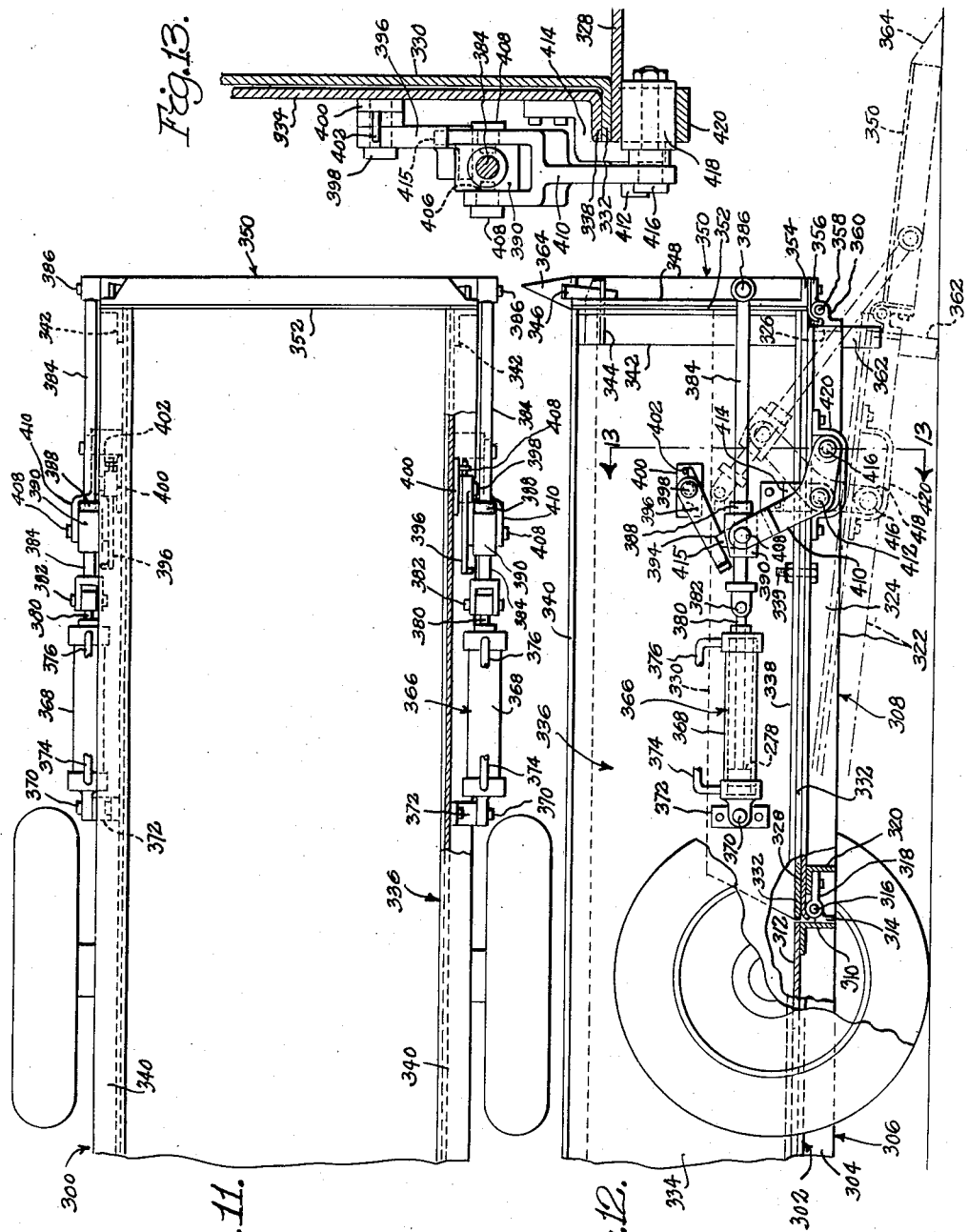
Inventor
Charles S. Ash
Barthel & Bugbee
Attorneys

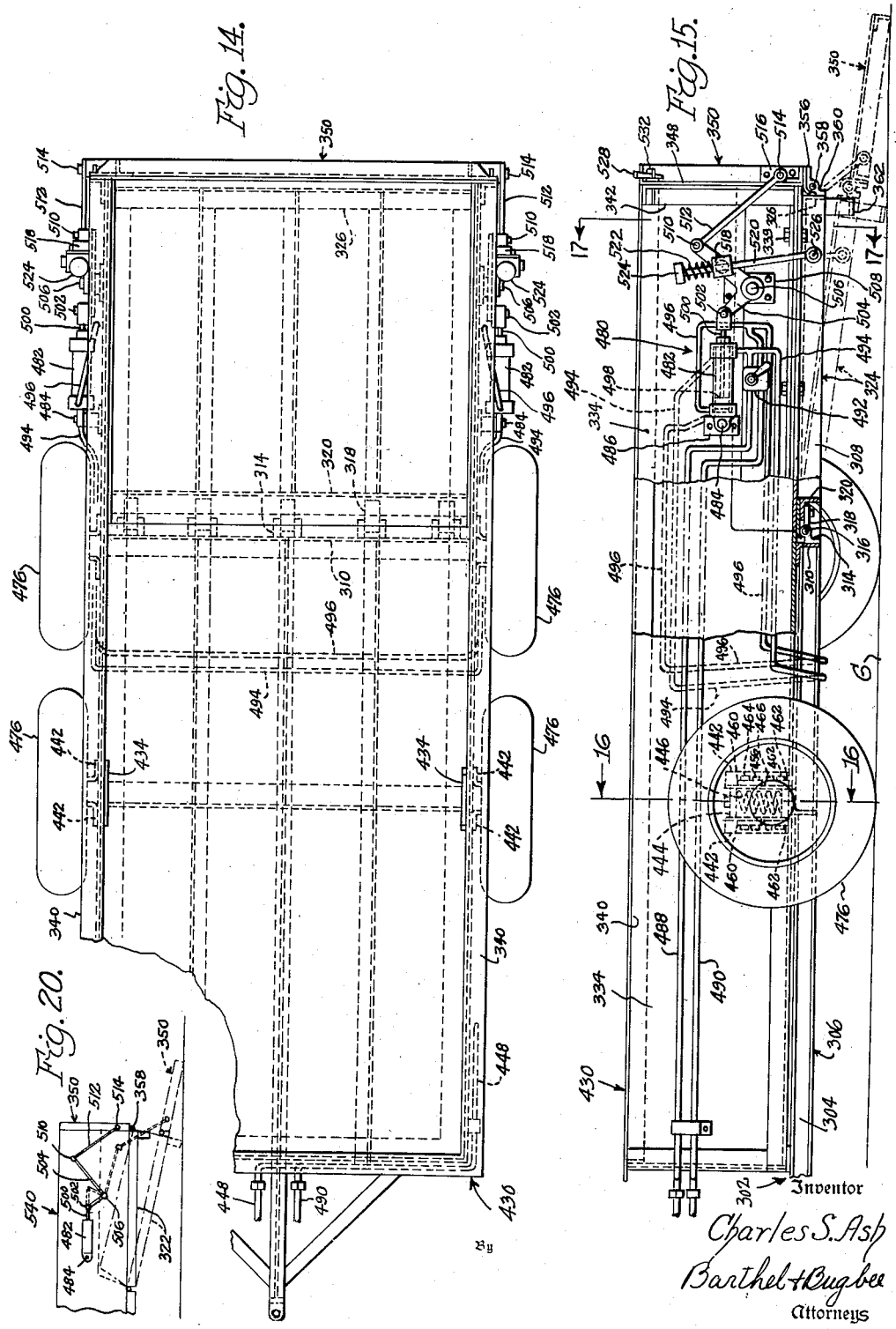

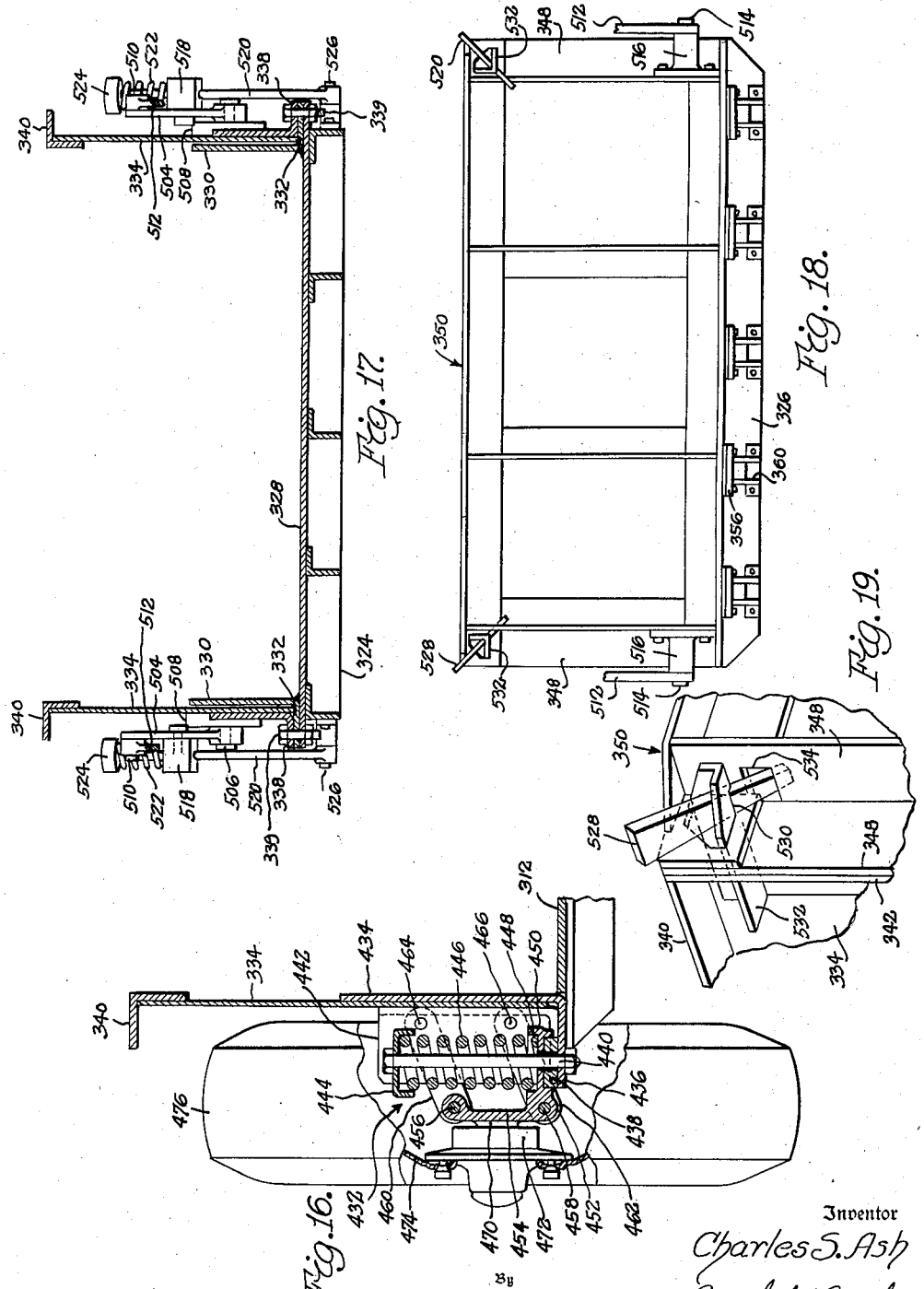

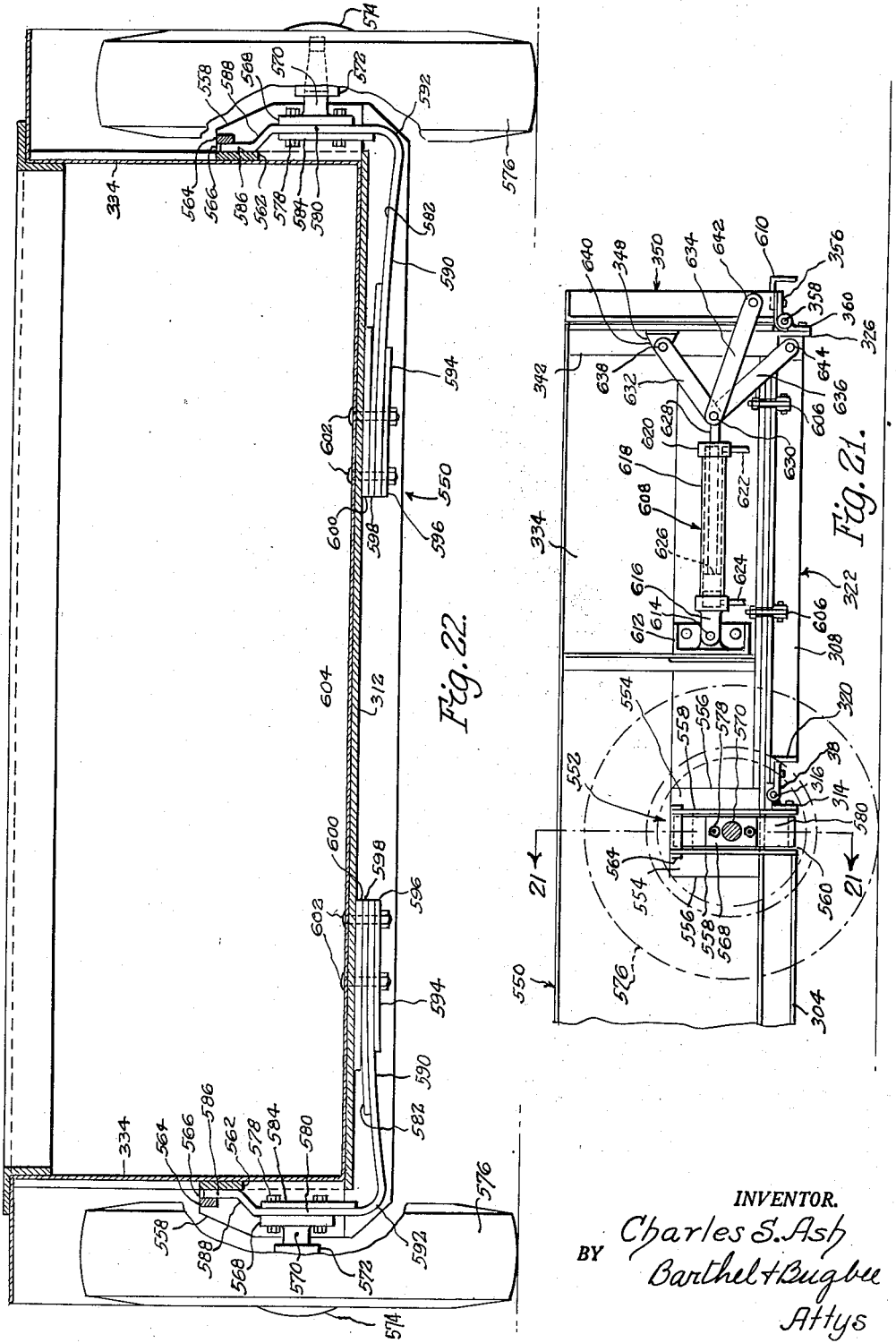

United States Patent Office 2,954,137
Patented Sept. 27, 1960

2,954,137

RAMP LOADER

Charles S. Ash, 2220 Wixom Road, Milford, Mich.

Filed July 2, 1958, Ser. No. 746,303

9 Claims. (Cl. 214—505)

This invention relates to vehicles and, in particular, to trailers.

One object of this invention is to provide a trailer adapted to be more easily loaded and unloaded than prior trailers, particularly for carrying heavy goods or articles loaded from or unloaded to the ground level.

Another object is to provide a trailer of the foregoing character which has a bottom structure pivoted to the remainder of the trailer and capable of being raised and lowered, preferably by power-operated mechanism, for loading and unloading articles at or near the ground level.

Another object is to provide a trailer of the character set forth in the object immediately preceding, wherein the trailer is supported by wheels mounted on an axle having a downwardly-disposed central portion which permits lowering the bottom structure for ease of loading and unloading.

Another object is to provide a trailer of the foregoing character which is provided with a tail gate connected to the bottom structure so as to rise and fall therewith and serve as a ramp therefor.

Another object is to provide a trailer according to the object immediately preceding wherein the mechanism for raising and lowering the bottom structure is also connected to the tail gate for raising and lowering the tail gate.

Another object is to provide a trailer of the foregoing character wherein the bottom structure is provided with upstanding side portions which cooperate with the side walls of the trailer in preventing loss of materials or contents as the bottom structure is raised or lowered.

Another object is to provide a trailer for carrying heavy goods or articles capable of being easily loaded and unloaded from near the ground level, the trailer having an improved wheel suspension which assists in the attainment of the foregoing objects by enabling the bottom portion of the trailer to be more easily raised and lowered for loading and unloading.

Other objects and advantages of the invention will become apparent during the course of the following description of the accompanying drawings, wherein:

Figure 1 is a top plan view of a trailer with a raisable and lowerable bottom structure and tail gate ramp, according to one form of the invention, with the bottom structure and tail gate in their lowered positions;

Figure 2 is a side elevation of the trailer shown in Figure 1;

Figure 3 is a rearward end elevation of the trailer shown in Figures 1 and 2;

Figure 4 is a vertical cross-section taken along the line 4—4 in Figure 2;

Figure 5 is a rearward end elevation, partly in cross-section, through the intermediate part of the trailer, with the bottom structure and tail gate in their raised positions;

Figure 6 is an enlarged fragmentary vertical cross-section taken along the line 6—6 in Figure 2, showing a locking bolt for the rearward end of the bottom structure;

Figure 7 is a top plan view of a trailer according to a modification of the trailer shown in Figures 1 to 6 inclusive, wherein the bottom structure is raised and lowered by hand-cranked cable-operated mechanism;

Figure 8 is a side elevation of the modified trailer shown in Figure 7;

Figure 9 is a top plan view of a further modified trailer wherein the bottom structure is raised and lowered by hand-cranked gearing;

Figure 10 is a side elevation of the further modified trailer shown in Figure 9;

Figure 11 is a top plan view of a still further modified trailer wherein only the rearward part of the bottom structure is capable of being raised and lowered, and wherein the trail gate is linked to the raising and lowering mechanism;

Figure 12 is a side elevation, partly in section, of the modification of Figure 11;

Figure 13 is an enlarged fragmentary vertical cross-section taken along the line 13—13 in Figure 12;

Figure 14 is a top plan view of another modification similar to Figures 11 and 12 but employing a different raising and lowering mechanism;

Figure 15 is a side elevation, partly in section, of the modification shown in Figure 14;

Figure 16 is a vertical cross-section taken along the line 16—16 in Figure 15;

Figure 17 is a vertical cross-section taken along the line 17—17 in Figure 15;

Figure 18 is a rear elevation of the modified trailer shown in Figures 14 and 15;

Figure 19 is a fragmentary enlarged perspective view of the rearward upper corner of the trailer of Figures 14 and 15, showing the means of locking the tail gate in its raised position;

Figure 20 is a fragmentary reduced size view, in side elevation, of still another modification of the trailers shown in Figures 11 and 14, but employing a different linkage for raising and lowering the bottom structure and tail gate;

Figure 21 is a side elevation of the rearward portion of a trailer according to a further modification of the invention, comprising an improved wheel and axle suspension and a simplified raising and lowering mechanism for the tail gate and bottom structure; and Figure 22 is a vertical cross-section taken along the line 2—2 in Figure 21.

Hitherto, it has been difficult or inconvenient to load or unload a trailer from or to the ground level respectively, because of the necessity of raising and lowering the load from the ground level to the level of the trailer bottom, particularly where the wheels of the trailer have been mounted on a substantially straight transverse axle. Under such circumstances, it has been necessary or at least advisable to employ external loading equipment or load the trailer from a suitably raised loading ramp or platform. In the absence of such external loading equipment or loading platform, it has often been found very difficult to load or unload a conventional trailer of the above-described type.

The present invention facilitates the loading or unloading of a trailer from or to the ground level by providing a bottom structure which is pivoted, in whole or in part, to the remainder of the trailer so as to drop downward nearer the ground level, this lowering of the bottom structure being facilitated by the use of a centrally-dropped axle upon the raised outer ends of which the ground wheels of the trailer are mounted. In the lowered position of the bottom structure, the tail gate swings downward to serve as a loading or unloading ramp, and certain forms of the invention provide means whereby the tail gate is raised and lowered by the same mechanism used for raising and lowering the bottom structure.

Trailer with pivoting of entire bottom structure

Referring to the drawings in detail, Figures 1 to 6 inclusive show a trailer, generally designated 30, according to one form of the invention as having a frame, generally designated 32, consisting of parallel side members 34 with inwardly-bent forward portions 36 converging toward one another and interconnected at their forward ends by a triangular coupling plate 38 having an aperture 40 to which is secured the conventional coupling mechanism (not shown) by which the trailer is relatively coupled to a conventional tractor. The side members 34 of the frame 32 are open or unconnected at their rearward ends whereas near their junctions 42 with the forward portions 36 they are interconnected by a cross member 44, the side members 34, forward portions 36 and cross members 44 being preferably of channel cross-section. Also interconnecting the frame side members 34 near their corners 42 is an additional cross member 46 resting on top of the frame side members 34, the cross members 44 and 46 being secured as by welding to the side members 34 and their forward extensions 36.

Secured to and rising from the frame 30 is a bottomless load-carrying trailer body, generally designated 48, consisting of a forward panel 50 secured to the cross member 46, and side panels 52 secured to the forward panel 50 and to the webs of the frame side members 34 (Figure 4). This securing may be accomplished by welding or in any other suitable manner, such as by bolting or riveting. Angle members 54 are secured to the upper edges of the side panels 52 (Figures 2, 4 and 5) in order to prevent injury to the user of the trailer and to strengthen the body. Also secured to the frame side members 34 and extending outwardly therefrom on opposite sides of the midportions thereof are notched brackets 56 (Figure 5) seated in the channels 34 and secured therein as by welding. The notched brackets 56 have notches 58 which serve, in a manner described below, to support the midportion of a bottom structure, generally designated 60, which closes the bottom opening in the bottomless body 48.

The bottom structure 60 consists of multiple parallel longitudinal structure members 62 (preferably channel members, Figures 4 and 5) which are interconnected at their forward and rearward ends by forward and rearward structural cross members 64 and 66 respectively. A bottom plate 68 rests upon and is secured to the upper flanges of the structural members 62 (Figures 4 and 5) and sector-shaped or fan-shaped side plates 70 of roughly triangular form are secured to the outside surfaces of the outer channel members 62 in close proximity to and parallel with the side panels 52 of the body 50. The forward cross member 64 of the bottom structure 60 is provided with transversely-bored tongues or pivot elements 72 (Figure 1) which are pivotally connected as by the pivot pins 74 to the spaced pairs of ears 76, the latter in turn being welded or otherwise secured to the frame cross member 44.

In order to support the trailer 30 during travel and also to provide for the bottom structure 60 in its lowered position (Figures 1 to 4 inclusive), each side frame member 34 is provided with two transversely-aligned pairs of approximately H-shaped axle brackets 80 and 82 respectively (Figure 1), the rearward pair of axle brackets 82 being shown in Figure 4. These axle brackets have spaced parallel inner arms 84 which extend above and below the flanges of the side frame members 34 in close proximity thereto and are secured thereto by bolts 86. The axle brackets 82 are provided with vertical portions 88 to which the inner arms 84 are secured and from which the more widely-spaced outer arms 90 project outwardly (Figure 4). The upper and lower outer arms 90 are bored as at 92 and 94 respectively with algined bores which receive the vertical outer end portions 96 of dropped axles, generally designated 98, the central portions 100 of which are horizontal and extend nearer the ground level G than the side frame members 34. The forward and rearward axles 98 are thus approximately U-shaped and have their upper ends threaded to receive retaining nuts 102.

Slidably mounted upon the outer vertical end portions 96 of the axles 98 are blocks 104 which are bored as at 106 for that purpose. Helical compression springs 108 mounted on the upper portions of the axle ends 96 above the blocks 104 urge the latter downwardly against the lower outer arms 90 of the axle brackets 82. Projecting outwardly from each block 104 is a stub axle 110 upon which a ground wheel 112 carrying a pneumatic tire 114 is rotatably mounted.

Secured to the mid-portions of the opposite sides of the bottom structure 60 are outwardly-extending arms 116 which in particular are welded or otherwise secured to the lower flanges of the longitudinal bottom strurctural members 62, these arms 116 having spaced ears 118 at their outer ends carrying pivot pins 120 upon which the lower ends of pivot bolts 122 are pivotally mounted so as to swing upwardly into the notches 58 of the brackets 56 when the bottom structure 60 is in its raised position. Nuts 124 are threaded upon the upper ends of the pivot bolts 122 in order to secure the pivot bolts 122 to the brackets 56 (Figure 5).

Secured to and extending rearwardly from the rearward cross member 66 of the bottom structure 60 are multiple spaced pairs of ears 126 carrying pivot pins 128 on which the forward ends of suitably bored structural members 130 are pivotally mounted. Secured as by welding to these structural members 130 is the back plate 132 of the tail gate, generally designated 134, formed thereby. Secured as by welding to the lower flange of the rearward cross member 66 are spaced feet 136 which support the rearward end of the bottom structure 60 in its lowered position (Figure 2). The outer portion of the tail gate plate 132 (or upper portion in its raised position) is provided with rectangular slots 138 arranged near the outer corners thereof (Figure 1) aligned with the outer or rearward ends of latch arms 140 or hasps which are riveted or otherwise secured to the side panels 52 of the body 48 (Figure 2) and which are provided with bolt-receiving apertures 142. Slidable into and out of the apertures 142 are locking bolts 144 reciprocably mounted in longitudinally-bored housings or sleeves 146 which are welded or otherwise fixedly secured to the tail gate plate 132 and its outer arms 130 (Figure 5). Each bolt 144 at its inner end is provided with a handle portion 148 by which the bolt 144 is reciprocated into or out of locking position relatively to the latch arms or hasps 140.

In order to latch the rearward corners of the bottom structure 60 in their raised positions, the side plates 70 and outer longitudinal structural members 62 are provided with aligned bolt holes 150 and 152 respectively (Figure 6) which are adapted to receive the end portions or wear sleeves 154 of locking bolts 156, the shanks 158 of which are reciprocable in bores 160 of supporting blocks 162 shaped to fit into and be secured as by welding to the rearward ends of the side frame members 34. The outer ends of the bolts 156 are provided with apertured ears 164 to facilitate grasping and operating the bolts.

While the bottom structure 60 and its attached tail gate 134 may be raised and lowered by hand, it is preferred to use suitable mechanism for this purpose, preferably power-operated mechanism. The mechanism shown in Figures 1 to 5 inclusive includes hydraulic or pneumatic cylinders 166 pivotally mounted as at 168 on the vertical rearward angle members 170 attached to the rearward edges of the body side plates 52 and containing reciprocating pistons 171, the piston rods 172 of which are pivotally attached as at 174 to the upper ends of bent levers 176 pivotally mounted as at 178 on brackets 180 bolted or otherwise secured to the lower flanges of the frame side members 34. The lower ends of the bent levers 176 are connected to a cross rod 182 which engages elongated slots or guideways 184 formed between retaining members 186 and the bottom structural members 62 to which they are bolted or otherwise secured. Service pipes 188 and 190 run respectively to opposite ends of the hydraulic cylinders 166 from a conventional four-way valve 192 into which pressure fluid supply and exhaust pipes 194 and 196 run. The four-way valve 192 is operated by a control handle or lever 198 for alternately supplying pressure fluid to one end of each hydraulic cylinder 166 and exhausting it from the other end in order to reciprocate the pistons 170. The pressure fluid supply and exhaust pipes 194 and 196 are connected to a conventional hydraulic pump and reservoir (not shown) such as are found in conventional tractors.

In the operation of the trailer constituting the form of the invention shown in Figures 1 to 6 inclusive, let it be assumed that the bottom structure 60 is in its raised position shown in Figure 5, with the latch bolts 144 engaging the apertures 142 of the hasps 140, while the bolts 156 are seated in the bolt holes 150, 152 (Figure 6) and the pivot bolts 122 are in supporting engagement with the brackets 56. To lower the bottom structure 60 in order to facilitate loading the trailer 30 the operator grasps the apertured ears 164 of the bolts 156 and pulls them outward to disengage their wear sleeves 154 on the aligned holes 150 and 152 (Figure 6) and then unscrews the nuts 124 on the pivot bolts 122 and swings the latter downward around their pivot pins 120 (Figure 5) into the positions shown in Figure 2, thereby unlatching the rearward and intermediate portions of the bottom structure 60. The operator then grasps the handle 148 of the tail gate bolts 144 (Figure 5) and pulls them inward to release them from engagement with the hasps 140, thereby releasing the tail gate 134 so that it may be swung downward.

The operator now actuates the handle or control lever 198 of the four-way valve 192 to supply pressure fluid to the pipe 188 from the supply pipe 194 and connect the service pipe 190 to the exhaust pipe 196, thereby causing the piston 170 and piston rod 172 to move to the right into the positions shown in Figure 2, swinging the bent lever 176 clockwise and thereby lowering the rearward end of the bottom structure 60 while the forward end therof pivots on the pivot pins 74. The dropped central portions 100 of the axles 198 permit the lowering of the bottom structure 60 in this manner, and the side plates 70 (Figure 4) cover the gap which would otherwise open up between the bottom plate 68 and the side panels 52 of the bottomless body 50. The rearward end of the bottom structure 60 comes to rest with the supporting feet 136 upon the ground level G and the tail gate 132 may be swung downward so that its back plate 132 forms a ramp leading upwardly to the bottom plate 68 of the bottom structure 60.

The material or cargo to be transported may then be drawn or pushed up the tail gate ramp 132 and inclined bottom plate 68 into the trailer body 50, whereupon the operator operates the four-way valve 192 reversely to reverse the direction of reciprocation of the pistons 170 and piston rods 172 in order to swing the bent levers 170 in a counterclockwise direction. This raises the bottom structure 60 into the raised position shown in Figure 5, so that the bolts 156 and 122 may be inserted in their respective holes or notches 150—152 and 58 respectively in order to lock the bottom structure 60 in that position. The tail gate 134 may then be swung upward and locked by its bolts 144 to the hasps 140 (Figure 5), by reversing the previously-described procedure.

The modified trailer, generally designated 200, shown in Figures 7 and 8, is generally of the same construction as the trailer 30 shown in Figures 1 to 6 inclusive, and differs only in the mechanism by which the bottom structure 60 is raised and lowered, hence similar parts are designated by similar reference numerals. In Figures 7 and 8, the bent levers 176, instead of being actuated by hydraulic cylinders as in Figures 1 to 6 inclusive, are actuated by a hand crank cable operating unit, generally designated 202. The operating unit 202 is in part mounted upon a shelf 204 in the form of a plate secured at its opposite ends to the upper flanges of the converging forward portions 36 of the frame side members 34. The shelf 204 is provided at one end with a suitably bored boss 206 in which is journaled a shaft 208 carrying a crank 210 at its outer end. The midportion of the shaft 208 is journaled in a boss 212 in a gear box 214 (Figure 7) and its inner end carries a worm 216 which meshes with a worm gear 218 within the gear box 214. The worm gear 218 is mounted upon an output shaft 220 which is journaled in bearing bosses 222 in the opposite side walls of the gear box 214 and on one end carries a drum or windlass 224 encircled by several turns of the midportion of a flexible actuating member 226, such as a cable, chain or the like. The flexible actuating member 226 passes around pulleys or sheaves 228, the axle 230 of which are supported on brackets 232 bolted or otherwise secured to the cross member 46.

The rearward ends of the flexible actuating member 226 are connected as at 234 to clevises 236 mounted on the forward ends of operating rods 238, the rearward ends of which carry clevises 240 pivotally secured to the pivot pins 242 at the upper ends of the bent levers 176. Each of the operating rods 238 is guided in its reciprocation by one or more guide brackets 244 bolted or otherwise secured to the body side panels 52.

The operation of the modified trailer 200 of Figures 7 and 8 is generally similar to that of the trailer 30 of Figures 1 to 6 inclusive, especially as regards the locking and unlocking of the various parts as heretofore described. To raise or lower the bottom structure 60 around its pivot pins 74, however, the operator turns the hand crank 210 to rotate the drum or windlass 224 so as to wind the flexible actuating member 226 upon the drum 224 or unwind it therefrom, thereby either swinging the levers 176 in a counterclockwise direction to raise the bottom structure 60, or in a clockwise direction to lower the same, in the manner described in connection with Figures 1 to 6 inclusive. It will be understood, of course, that in place of the hand crank 210 a motor may be attached to the shaft 208 for the same purpose.

The further modified trailer, generally designated 250, shown in Figures 9 and 10 is also similar in its general construction to the trailers 30 and 200 previously described, but differs from them in the manner of raising and lowering the bottom structure 60. Similar reference numerals are therefore employed for corresponding parts. The bottom structure 60 of Figures 9 and 10 is raised and lowered by a hand-cranked gear and lever unit, generally designated 252, mounted on the rearward end portion of the frame 50. A hand crank 254 is mounted on the outer end of a shaft 256 journaled in an elongated bracket 258, the opposite ends of which are bolted to one of the frame side members 34 and carries a pinion 260. The latter meshes with a gear 262 mounted on a countershaft 264 which is also journaled in the bracket 258 and carries a pinion 266 which meshes with a quadrant gear 268. The quadrant gear 268 is mounted on a third shaft 270 which is also journaled in the bracket 258 and which carries a crank arm 272, the lower end of which is provided with a pivot pin 274 pivotally connected to the upper end of a link 276.

The lower end of the link 276 is pivoted as at 280 to one arm of a bent lever 282 pivotally mounted upon a cross shaft 284, which in turn is journaled in bearing brackets 286 bolted to the undersides of the outer longitudinal structural member 62 of the bottom structure 60. Mounted upon the opposite end of the cross shaft 284 is a crank arm 288. The upper ends of the bent lever 282 and crank arm 288 carry inwardly-projecting pins 290 which engage elongated guide grooves 292 formed between wear bars 294 and guide members 296 bolted or otherwise secured to the rearward portions of the frame side members 34.

In the operation of the modified trailer 250 shown in Figures 9 and 10, the bottom structure 60 and tail gate 134 are locked and unlocked in the previously-described manner. To raise or lower the bottom structure 60, however, the operator turns the crank 254 in the appropriate direction, this motion being transmitted through the reduction gearing 260, 262, 266, 268 to the output shaft 270, swinging the crank arm 272 in one direction or the other and consequently raising or lowering the link 276 so as to swing the bent lever 282, cross shaft 284 and crank arm 288 in a clockwise or counterclockwise direction so as to raise or lower the bottom structure 60 around its pivot pins 74 by the action of the pins 290 in the guideways 292. Again it will be understood that a motor may be drivingly connected to the input shaft 256 in place of the hand crank 254 if a motor drive is desired.

*Trailer with pivoting of part of bottom structure*

The modifications shown in Figures 11 to 20 inclusive differ principally from the forms of the invention shown in Figures 1 to 10 inclusive in having a part of the bottom structure stationary and the remainder pivoted, instead of having the entire bottom structure pivoted as in Figures 1 to 10 inclusive. The modified trailer, generally designated 300, shown in Figures 11 to 13 inclusive is, like the preceding forms of the invention, mounted on a frame, generally designated 302, having parallel longitudinal forward frame members 304. The forward portion of the frame 302 in Figures 11 and 12 is omitted because it is essentially the same construction as the forward portion of the frame 32 of Figures 1 and 2. The frame 302, unlike the frame 32, is divided into a forward frame, generally designated 306, and a rearward frame, generally designated 308, the former being stationary and the latter pivoted so as to be raised or lowered relatively thereto, as shown by the dotted lines in Figure 12.

The forward longitudinal frame members 304 of the forward frame 306 are preferably of channel cross-section, like the channel frame members 34 of Figures 1 and 2, and are interconnected near their rearward ends by a cross member 310 of angle or channel cross-section. A forward floor plate 312 is mounted on the forward frame 306 (Figure 12) and the cross member 310 supports the rearward end of the forward floor plate 312. Secured to the cross member 310 are stationary hinge brackets 314 carrying pivot pins 316 upon which swinging hinge brackets 318 are pivotally mounted. Bolted or otherwise secured to the swinging hinge brackets 318 is the forward cross member 320 of the rearward frame 308 which supports the movable bottom structure, generally designated 322. The rearward frame 308 includes parallel longitudinal side members 324 and a rearward cross member 326 upon which is supported the rearward bottom floor plate 328. The bottom structure 322 further includes side plates 330 with perpendicular bottom flanges 332 abutting and secured to the floor plate 328 and side members 324.

In the raised position of the bottom structure 322, the side plates 330 lie parallel and in close proximity to the rearward portions of the side panels 334 of the trailer body, generally designated 336, and the panels 334 have bottom edge flanges 338 against which the flanges 332 of the bottom structure side plates 330 abut (Figure 13). The flanges 332 and 338 and the bottom floor plate 328 are bored with aligned holes to temporarily receive locking bolts 339 which are removed when it is desired to lower the bottom structure 322. The side panels 334 of the trailer body 336 extend from end to end thereof and their forward portions are secured at their lower flanged edges to the stationary floor member or floor plate 312 and the forward frame 306. Thus the rearward portions of the side panels 334 overhang the movable rearward frame 308 of the movable bottom structure 322.

Horizontal angle members 340 are secured to the upper edges of the body side panels 334 and vertical angle members 342 are secured to the rearward ends thereof. Hasps or latch members 344 are secured to and project horizontally behind the angle members 342, which are provided with L-shaped apertures through which these project. The rearward end portions of the latch members or hasps 344 are perforated to receive wedge-shaped latch pins 346 and immediately ahead of the latch pins 346 pass through apertures in the end members 348 of a tail gate 350. The tail gate 350 has a panel 352 to which the multiple vertical members 348 are secured for strengthening purposes. These are in turn secured to a tail gate cross member 354 to which are bolted or otherwise secured swinging hinge brackets 356 which are connected by pivot pins 358 to fixed hinge brackets 360 secured to the bottom frame cross member 326. The latter also carries spaced supporting feet 362 similar to the feet 136 of Figure 2. The tail gate 348 at its free edge is provided with an edge member 364 of wedge-shaped configuration which serves as a preliminary ramp for the tail gate 350 which in itself serves as a ramp for the bottom structure 322.

The raising and lowering mechanism, generally designated 366, for the bottom structure 322 and tail gate 350 consists of a pair of hydraulic or pneumatic cylinders 368, the forward ends of which are pivoted as at 370 to brackets 372 bolted to the side panels 334. The hydraulic cylinders 368 are provided with service pipes 374 and 376 at the opposite ends thereof, these being connected to a hydraulic circuit similar to that shown in Figures 1 and 2 and similarly regulated by a conventional four-way valve (not shown). Reciprocably mounted in the hydraulic cylinders 368 are pistons 378, the piston rods 380 of which are pivotally connected at 382 to the forward ends of connecting rods 384, the rearward ends of which are pivoted as at 386 to the opposite end members 348 of the tail gate 350.

Fixedly mounted on each connecting rod 384 is a stop collar 388 which engages a slide block 390 mounted on and bored to slide along the forward portion of the connecting rod 384. A pair of latching levers 396 with latching notches 394 are mounted one on each side panels 334 by means of a pivot pin 398 secured to a bracket 400 which in turn is bolted to the side panel 334. A stop pin 402 engaged by a lug 404 on each latch lever 396 limits the downward swinging thereof.

Pivotally engaging the pivot sockets 406 in the opposite sides of each slide block 390 are pivot pins or trunnions 408 (Figure 13) which are passed through and are carried by the yoked upper end portion of each of a pair of bent levers 410, the midportions of which are pivoted as at 412 to angle brackets 414 bolted or otherwise secured to the body side panels 334. Each of the bent levers 410 at its upper end carries a latching leg 415 engageable with the latching notch 394 in its respective latching lever 396. The opposite ends of the bent levers 410 carry axles 416 in the form of stud bolts upon which rollers 418 are rotatably mounted. The rollers 418 in turn engage the lowest surface of the rearward bottom floor plate 328, and the upper elongated surfaces of elongated retaining members 420 which at their opposite ends are bolted or otherwise secured to the bottom structure longitudinal side members 324 (Figure 12). The wheel and axle construction is substantially the same as that previously described in connection with Figure 2, hence requires no repetition.

In the operation of the modified trailer shown in Figures 11 to 13 inclusive, let it be assumed that the parts are in the positions shown in Figure 12, and that it is desired to lower the tail gate 350 and bottom structure 322. To do this, the operator first removes the tail gate latch pins 346 from the hasps 344 and lifts the latching levers 396 off the lugs 392. He then actuates the four-way control valve (not shown) in a manner similar to that described in connection with Figure 2 to admit pressure fluid through the service pipes 374 to the forward ends of the hydraulic cylinders 368 and exhaust fluid through the pipes 376 at the rearward ends thereof. Under these circumstances, the pistons 378 and their piston rods 380 move rearwardly, consequently moving the connecting rods 384 rearwardly so as to swing the tail gate 350 rearwardly and downwardly. At the same time, the fixed stop collars 388 move rearwardly with their connecting rods 384, permitting the slide blocks 390 likewise to move rearwardly so as to permit the bent levers 410 to swing in clockwise directions around their pivot pins 412, causing their rollers 418 to travel along their elongated paths between the retaining members 420 and the bottom floor plate 328, lowering the bottom structure 322 around its pivot pins 316 into the dotted line position of Figure 12, with the tail gate 350 serving as a ramp for the bottom structure 322. The material, equipment or articles to be carried by the trailer 300 and constituting the load thereof are then taken up into the body 336 over the tail gate ramp 350 and inclined rearward bottom floor plate onto the forward bottom floor plate 312, whereupon the operator reverses the four-way valve to supply pressure fluid to the service pipes 376 at the rearward ends of the hydraulic cylinders 368 and exhaust fluid from the forward pipes 374 thereof.

When thus supplied with pressure fluid, the pistons 378, their piston rods 380 and connecting rods 384 move upwardly and forwardly from their dotted line positions (Figure 12), first swinging the tail gate 350 upwardly until the stop collars 388 engage the slide block 390. The slide blocks 390, thus picked up by the stop collars 388, swing the bent levers 410 counterclockwise around their pivot pins 412, causing the rollers 418 to travel rearwardly along their guideways formed by the retaining members 420, swinging the bottom structure 322 upwardly from the dotted line position into the solid line position of Figure 12. By this mechanism, the tail gate is thus caused to commence closing, followed by the upward swinging of the bottom structure in a sequential manner. As the lugs 392 on the slide blocks 390 pass underneath the latch levers 396, they swing the latter upward and drop into the notches 394 therein, locking the assembly in its raised position. The operator then inserts the latch pins 346 in the perforated hasps 344, which have meanwhile been engaged by the aligned holes in the tail gate 350, thereby locking the tail gate 350 in its raised position.

The modified trailer, generally designated 430, shown in Figures 14 to 19 inclusive, is generally similar in construction to the trailer 300 of Figures 11 to 13 inclusive, except for the bottom structure raising and lowering mechanism, hence similar parts are designated with similar reference numerals. The wheel and axle construction, however, is somewhat different. The wheel suspensions, generally designated 432, are attached directly to the body side panels 334 which in this modification of Figures 14 to 19 inclusive lack the bottom flanges 338 of Figures 11 to 13. In order to strengthen the side panels 334 for the attachment of the wheel suspensions 432, angle plates 434 are welded or otherwise secured thereto on the inside thereof (Figures 14 and 16), and these have bottom flanges 436 which extend underneath the lower edges of the body side panels 334 into supporting relationship with the suspensions 432. Superimposed upon the flange 436 is an abutment bar or block 438, both being bored to receive the lower end of a vertical bolt 440 (Figure 16).

Also secured to and rising from the flange 436 and bolted or otherwise secured to the body side panels 334 are spaced parallel vertical angle members 442 which are bridged at the top thereof by a horizontal channel member 444 which serves as an abutment for the upper end of a coil spring 446, the lower end of which rests in a socket 448 in the lower arm 450 of an angle link 452 in the form of an angle plate resting upon the abutment bar or block 438 and recessed on its lower side to receive the latter. The vertical portion 454 of the angle link 452 is drilled horizontally at its upper and lower ends to receive upper and lower pivot pins 456 and 458 by which it is pivotally mounted upon the outer ends of upper and lower pairs of links 460 and 462 respectively. The inner ends of the links 460 and 462 are pivoted as at 464 and 466 to the vertical angle members 442. The vertical portion 454 of each angle link 452 carries a stub axle 470 upon which the hubs 472 of the wheels 474 are rotatably mounted. The wheels 474 are, as usual, bolted to the hubs 472 and carry the usual pneumatic tires 476. As a consequence of this construction, as the wheels 474 ride over rough places in the road or ground, the axles 470 thereof and the angle links 452 move upward and downward on the upper and lower pairs of parallel links 460 and 462, compressing and expanding the springs 446 against the horizontal channel member 444 which serves as a spring abutment, thereby absorbing the shocks.

The raising and lowering mechanism, generally designated 480, of Figures 14 to 19 inclusive, consists as before of a pair of hydraulic or other fluid pressure cylinders 482 pivoted as at 484 to brackets 486 bolted or otherwise secured to the side panels 334. Pressure fluid supply and exhaust pipes 488 and 490 respectively lead from a conventional hydraulic pump and reservoir circuit to a conventional four-way valve 492 from which service pipes 494 and 496 lead to the opposite ends of the hydraulic cylinders 482 for oppositely reciprocating the pistons 498 and piston rods 500 thereof.

Each piston rod 500 is pivotally connected as at 502 to a bell crank lever 504 which is pivotally mounted at 506 on a bracket 508 bolted or otherwise secured to the side member 334. The opposite end of the bell crank lever 504 is pivoted at 510 to the upper end of a link 512, the lower end of which is pivotally connected as at 514 to a bracket 516 bolted or otherwise secured to the end of the tail gate 350 (Figure 18). Also pivotally mounted on each bell crank lever 504 between the pivots 506 and 510 is a pivoting block 518 which is suitably bored to slidably receive a rod 520. The latter at its upper end is encircled by a coil spring 522, the opposite ends of which respectively engage the pivoting block 518 and a head 524 on the rod 520. The lower end of each rod 520 is pivotally connected as at 536 to one of the longitudinal side members 324 of the bottom frame 308 of the pivoted bottom structure 322. The tail gate 350, as before, is pivoted by pivot pins 357 to the bottom structure 322.

The tail gate 350 is locked in its raised position by inclined wedge-shaped latching pins 528 (Figures 18 and 19) which are inserted through holes 530 in angle hasps 532 which in turn are secured to the side panels 334 and project through aligned apertures in the angle members 342 and 348 at the end of the body side panels 334 and tail gate 350 respectively. The lower ends of the pins 528 likewise penetrate apertures 534 in the angle members 348 at the opposite ends of the tail gate 350.

The operation of the modified trailer 430 of Figures 14 to 19 inclusive is generally the same as that described in connection with Figures 11 to 13 inclusive, except as regards the slightly different mode of operation of the raising and lowering mechanism 480. Assuming that the parts are in their raised positions as shown in Figures 14 and 15, and that the locking bolts 339 and latching pins 522 have been removed, to lower the bottom structure 322 and tail gate 350, the operator shifts the four-way valve 492 to cause pressure fluid to enter the service pipes 496 from the pressure fluid supply pipe 488 and connect the service pipes 494 to the exhaust pipe 490. The pistons 498 and piston rods 500 accordingly move rearwardly, swinging the bell crank levers 504 clockwise around their pivots 506 and causing the links 512 to lower the tail gate 350 into its dotted line position of Figure 15, At the same time, the pivot blocks 518 swing downward with the swinging of the bell crank levers 504, causing the rods 520 to lower the bottom structure 322 around its pivots 316, so that it comes to rest with the legs 362 on the ground G. The material or articles to be loaded may then be moved up the inclined tail gate 350 and inclined bottom structure 322 onto the stationary or fixed bottom or floor plate 312, whereupon the operator reverses the four-way valve 492 to supply pressure fluid to the forward ends of the hydraulic cylinders 482. As a consequence, the pistons 498 and piston rods 500 move forwardly, swinging the bell crank levers 504 counterclockwise, and accordingly raising the links 512 and rods 520, thereby swinging the tail gate 350 upwardly and raising the bottom structure 322 into the solid line positions shown in Figure 15. The latch pins 528 may then be inserted in the apertures 530 and 534 (Figure 19), locking the tail gate 350 in its raised position and, if desired, the locking bolts 339 may also be inserted to additionally lock the bottom structure 322 in its raised position.

The modified trailer, generally designated 540, shown diagrammatically in Figure 20, is identical with that shown in Figure 15, except that the rods 520 and pivot blocks 518 have been omitted. As a consequence, the connecting rods 512 are relied upon not only to swing the tail gate 350 upwardly into its raised position but also, at the same time, to raise the bottom structure 322 through the connection of the rods 512 to the tail gate 350 at the pivot points 514. The operation is otherwise the same and hence calls for no further comment.

The modified trailer, generally designated 550, shown in Figures 21 and 22 is also generally similar in construction to the trailer 300 of Figures 11 to 13 inclusive, except for the wheel and axle suspensions and the bottom structure raising and lowering mechanism, hence similar parts are designated with similar reference numerals. Each wheel and axle suspension, generally designated 552, includes a pair of angle members 554 of L-shaped cross-section (Figure 21) disposed in spaced parallel relationship with their base flanges 556 welded or otherwise secured to the body side panels 334, whereas their remaining flanges 558 are disposed parallel to one another so as to form spaced parallel guide members. The flanges 558 are extended downwardly to the bottom of the forward longitudinal frame members 304 to lengthen the guideway 560 thereby provided. The angle members 554 are interconnected by spaced parallel back and front cross bars 562 and 564 respectively welded or otherwise secured thereto (Figure 22) with a guide piece 566 between them. The cross bars 562 and 564 are disposed substantially perpendicular to the guide flanges 558.

Reciprocably mounted between the guide flanges 558 for up and down motion is an axle supporting block 568 upon which an axle 570 is mounted, the axle 570 in turn carrying the hub 572 of a wheel 574 having a pneumatic tire 576 mounted thereon in the usual way. The block 568 is bolted as at 578 through the upstanding end portion 580 of an L-shaped spring leaf 582 to a retaining plate 584 (Figure 22). The upper end portion 586 of the upstanding portion 580 is spaced inwardly from the major portion thereof clamped between the block 568 and plate 584 and is connected thereto by a bent portion 588. The end portion 586 is reciprocably mounted in the space 566 between the bars 562 and 564 and at the same time is guided in its vertical movement by these bars, as well as by the side flanges 558. The horizontal portion 590 of the L-shaped spring leaf 582 is connected to the vertical portion 580 thereof by a bend 592, and forms one leaf of a transversely-disposed leaf spring unit, generally designated 594, of multiple leaf construction having additional leaves 596, 598 and 600. The leaf spring units 594 extend outwardly in opposite directions and are secured as by the bolts 602 to the forward bottom floor plate 604 superimposed thereon and forming an extension of the side panels 334.

The rearward construction of the trailer 550 is also similar to that shown in Figures 11 to 13 inclusive and similar parts are also designated with similar reference numerals. Swing bolts 606 are employed to lock the rearward movable bottom structure 322 in its closed or raised position, so as to take the load off the raising and lowering mechanism, generally designated 608. The tail gate 350 is hinged in a similar manner by hinges 356, 458 to the cross member 326, and an additional angle cross-member 610 is provided behind the lower edge of the tail gate 350 and bolted, riveted or otherwise secured thereto.

The raising and lowering mechanism 608 for simultaneously raising and lowering the rearward movable bottom structure 322 and the tail gate 350 around their respective pivots 316 and 358, is mounted on a pair of brackets 612 bolted to the opposite side panels 334 on the outside thereof. Pivotally secured to each bracket 612 as at 614 is one of the cylinder heads 616 of a hydraulic cylinder 618 arranged to swing in an up-and-down direction. The forward and rearward cylinder heads 620 and 616 are provided with hydraulic service pipes 622 and 624 respectively connected to a conventional four-way valve (not shown) which in turn is connected to a conventional hydraulic pump (also not shown). A piston head 626 reciprocates in each hydraulic cylinder 618.

The reciprocating motion of each piston head 626 is conveyed by a connecting rod 628 to a pivot pin 630 (Figure 21) which forms the common pivot for the forward end of upper, intermediate and lower links 632, 634 and 636. The rearward end of the upper link 632 is pivoted as at 638 to a bracket 640 secured to the rearward vertical angle members 342 so as to provide an anchorage for the upper links 632 on the body of the trailer 550. The rearward end of the intermediate link 634 is pivoted as at 642 to one side of the tail gate 350 (Figure 21) near the lower edge thereof but spaced a short distance above the hinge pivots 358, so as to provide a leverage effect which exerts a lifting force upon the tail gate 350. The rearward end of the lower link 636 is pivoted as at 644 to the rearward end of the movable bottom structure 322 so as to exert a raising and lowering effect thereon.

In the operation of the modified trailer 550 shown in Figures 21 and 22, as the trailer is towed in the usual manner and the wheels 574 pass over irregularities in the road, the jolts are cushioned by the transverse leaf spring units 594. As the supporting blocks 568 rise and fall in their guideways 560, they are guided in their vertical reciprocation by the side flanges 558, while the spring leaf portion 586 is guided between the cross bars 562 and 564. This construction provides a simple but strong and durable axle and wheel suspension which is particularly well adapted to trailer use.

To prepare to load the vehicle, the operator first swings the swing bolts 606 sideways out of their slots so as to free the movable bottom structure 322. He then admits pressure fluid to the forward service pipe 624 and discharges fluid from the rearward service pipe 622 by suitably setting the usual four-way valve (not shown). As the piston heads 626 and connecting rods 628 are pushed rearwardly by the pressure fluid, they push simultaneously upon the links 632, 634 and 636, while the cylinders 608 swing downwardly around their pivots 614. The upper links 632 guide the swinging of the connecting rods 628 while the intermediate links 634 are pushed rearwardly and downwardly to swing open the tail gate 350. At the same time, the lower links 636 are pushed downwardly, swinging the movable rearward bottom structure 322 downwardly around its pivot 316. The vehicle may then be loaded in the previously-described manner, using the tail gate 350 and bottom structure 322 as ramps while these are supported upon the angle member 356 which at this time rests upon the ground.

After the vehicle has been loaded, the four-way valve is reversed, retracting the piston heads 626 and piston rods 628, reversing the previously-described motions of the links 632, 634 and 636 and swinging the tail gate 350 and movable bottom structure 322 upward around their respective pivots. The bottom structure 322 is then locked in its raised position by the swing bolts 606, and the tail gate 350 is locked in position by one of the means shown in the previous forms of the invention, such as by locking bolts or pins (not shown).

What I claim is:

1. A wheeled vehicle comprising a frame structure, a body structure mounted on said frame structure and including a bottom member, said bottom member being hingedly connected at its forward end to one of said structures, axle means secured to one of said structures, wheels rotatably mounted on said axle means, a tail gate member hingedly connected at its forward edge to the rearward end of said bottom member, and mechanism operatively connected to one of said members for raising and lowering said tail gate member and the rearward end of said bottom member between a raised position for traveling and a lowered ramp position for loading.

2. A wheeled vehicle comprising a frame structure, a body structure mounted on said frame structure and including a bottom member, said bottom member being hingedly connected at its forward end to one of said structures, axle means secured to one of said structures, wheels rotatably mounted on said axle means, a tail gate member hingedly connected at its forward edge to the rearward end of said bottom member, and mechanism operatively connected to both of said members for raising and lowering said tail gate member and the rearward end of said bottom member between a raised position for traveling and a lowered ramp position for loading.

3. A wheeled vehicle comprising a frame structure, a body structure mounted on said frame structure and including a bottom member, said bottom member being hingedly connected at its forward end to one of said structures, axle means secured to one of said structures, wheels rotatably mounted on said axle means, and mechanism including a rotatable drum and a cable windable on said drum, said cable being operatively connected to said bottom member for raising and lowering the rearward end of said bottom member between a raised position for traveling and a lowered ramp position for loading.

4. A wheeled vehicle comprising a frame structure, a body structure mounted on said frame structure and including a bottom member, said bottom member being hingedly connected at its forward end to one of said structures, axle means secured to one of said structures, wheels rotatably mounted on said axle means, and mechanism including a linkage and gearing drivingly connected thereto, said linkage being operatively connected to said bottom member for raising and lowering the rearward end of said bottom member between a raised position for traveling and a lowered ramp position for loading.

5. A wheeled vehicle comprising a frame structure, a body structure mounted on said frame structure and including a stationary bottom member and a movable bottom member, said movable bottom member being hingedly connected at its forward end to said stationary bottom member, axle means secured to one of said structures, wheels rotatably mounted on said axle means, and mechanism operatively connected to said bottom member for raising and lowering the rearward end of said bottom member between a raised position for traveling and a lowered ramp position for loading.

6. A wheeled vehicle comprising a frame structure, a body structure mounted on said frame structure and including a stationary bottom member and a movable bottom member, said movable bottom member being hingedly connected at its forward end to said stationary bottom member, axle means secured to one of said structures, wheels rotatably mounted on said axle means, a tail gate member hingedly connected at its forward edge to the rearward end of said movable bottom member, and mechanism operatively connected to said movable bottom member for raising and lowering said tail gate member and the rearward end of said movable bottom member between a raised position for traveling and a lowered ramp position for loading.

7. A wheeled vehicle comprising a frame structure, a body structure mounted on said frame structure and including a bottom member, said bottom member being hingedly connected at its forward end to one of said structures, axle means secured to one of said structures, wheels rotatably mounted on said axle means, a bottom rest secured to and depending from the under side of said bottom member, a tail gate member hingedly connected at its lower edge to the rearward end of said bottom member, and mechanism operatively connected to one of said members for raising and lowering said tail gate member and the rearward end of said bottom member between a raised position for traveling and a lowered ramp position for loading.

8. A wheel suspension for a wheeled vehicle having a body structure including sides, said suspension comprising a vertical guide structure including a pair of spaced vertical guide members, an axle support mounted for vertical motion and guidance between said guide members, and a leaf spring structure secured transversely to said body structure and having a leaf with an upstanding end portion secured to said axle support.

9. A wheel suspension for a wheeled vehicle having a body structure including sides, said suspension comprising a vertical guide structure including a pair of spaced vertical guide members, an axle support mounted for vertical motion and guidance between said guide members, and a leaf spring structure secured transversely to said body structure and having a leaf with an upstanding end portion secured to said axle support, said guide structure having transversely-spaced guide elements disposed substantially perpendicularly to said guide members, and said upstanding end portion of said leaf extending through the space between said guide elements and reciprocably engaging said guide elements in response to the rise and fall of said axle support.

References Cited in the file of this patent

UNITED STATES PATENTS

| | | |
|---|---|---|
| 2,838,191 | Schramm | June 10, 1958 |
| 2,840,386 | McFarland et al. | June 24, 1958 |